US012424382B2

(12) United States Patent
Ohkubo et al.

(10) Patent No.: US 12,424,382 B2
(45) Date of Patent: Sep. 23, 2025

(54) METHOD FOR MANUFACTURING COIL COMPONENT HAVING RESIN WALLS

(71) Applicant: TDK CORPORATION, Tokyo (JP)

(72) Inventors: Hitoshi Ohkubo, Tokyo (JP); Masazumi Arata, Tokyo (JP); Manabu Ohta, Tokyo (JP); Shou Kawadahara, Tokyo (JP); Yoshihiro Maeda, Tokyo (JP); Takahiro Kawahara, Tokyo (JP); Hokuto Eda, Tokyo (JP); Shigeki Sato, Tokyo (JP)

(73) Assignee: TDK CORPORATION, Tokyo (JP)

( * ) Notice: Subject to any disclaimer, the term of this patent is extended or adjusted under 35 U.S.C. 154(b) by 952 days.

(21) Appl. No.: 17/224,508

(22) Filed: Apr. 7, 2021

(65) Prior Publication Data

US 2021/0225588 A1 Jul. 22, 2021

Related U.S. Application Data

(60) Division of application No. 16/555,169, filed on Aug. 29, 2019, now Pat. No. 10,998,130, which is a continuation of application No. 14/951,004, filed on Nov. 24, 2015, now Pat. No. 10,468,184.

(30) Foreign Application Priority Data

Nov. 28, 2014 (JP) ................................ 2014-241869
Nov. 28, 2014 (JP) ................................ 2014-241875
Nov. 28, 2014 (JP) ................................ 2014-241876

(51) Int. Cl.
*H01F 41/04* (2006.01)
*H01F 17/00* (2006.01)
*H01F 27/29* (2006.01)

(52) U.S. Cl.
CPC ....... *H01F 41/043* (2013.01); *H01F 17/0013* (2013.01); *H01F 27/292* (2013.01); *H01F 41/046* (2013.01); *H01F 2017/0066* (2013.01)

(58) Field of Classification Search
CPC ......... H01F 27/2804; H01F 2027/2819; H01F 41/041; H05K 1/165
See application file for complete search history.

(56) References Cited

U.S. PATENT DOCUMENTS 7,041,433 B1 5/2006 Schmitz et al.
2002/0112963 A1* 8/2002 Nakano .................. H01J 9/236 427/116
2004/0164835 A1 8/2004 Shoji
2005/0140488 A1* 6/2005 Shimoyama ........ H01F 17/0006 336/200

(Continued)

FOREIGN PATENT DOCUMENTS

CN 1224565 A 7/1999
CN 102982965 A 3/2013

(Continued)

*Primary Examiner* — Livius R. Cazan
(74) *Attorney, Agent, or Firm* — Oliff PLC

(57) ABSTRACT

In a coil component and a method for manufacturing the same, a winding part of a coil is grown by plating so as to extend between resin walls of a resin body provided before the coil is grown by plating. The resin wall is interposed between adjacent turns of the winding part of the coil during the plating growth, and therefore contact between adjacent turns of the winding part of the coil cannot occur.

18 Claims, 9 Drawing Sheets

(56) References Cited

U.S. PATENT DOCUMENTS

| | | | |
|---|---|---|---|
| 2005/0195062 | A1 | 9/2005 | Yoshida et al. |
| 2005/0275497 | A1 | 12/2005 | Ramadan et al. |
| 2006/0097820 | A1 | 5/2006 | Watanabe et al. |
| 2006/0152321 | A1* | 7/2006 | Jung .................. H01F 17/0006 336/200 |
| 2013/0222101 | A1 | 8/2013 | Ito et al. |
| 2013/0222104 | A1 | 8/2013 | Kitamura et al. |
| 2013/0249664 | A1 | 9/2013 | Tonoyama et al. |
| 2013/0293337 | A1* | 11/2013 | Lo ......................... H01F 41/041 336/200 |
| 2013/0300527 | A1 | 11/2013 | Kim et al. |
| 2014/0001397 | A1* | 1/2014 | Park ...................... H01F 41/046 252/62.54 |
| 2014/0009254 | A1 | 1/2014 | Ohkubo et al. |
| 2014/0077914 | A1 | 3/2014 | Ohkubo et al. |
| 2015/0035634 | A1 | 2/2015 | Nakamura et al. |
| 2015/0035640 | A1 | 2/2015 | Wang et al. |
| 2015/0042440 | A1 | 2/2015 | Tsurumi et al. |
| 2015/0102889 | A1 | 4/2015 | Choi et al. |
| 2015/0155093 | A1 | 6/2015 | Kim et al. |
| 2015/0270053 | A1 | 9/2015 | Cha et al. |
| 2016/0141090 | A1 | 5/2016 | Park et al. |
| 2016/0163444 | A1 | 6/2016 | Choi et al. |

FOREIGN PATENT DOCUMENTS

| | | | |
|---|---|---|---|
| CN | 103366920 | A | 10/2013 |
| CN | 103765533 | A | 4/2014 |
| JP | H07-213027 | A | 8/1995 |
| JP | H08-181019 | A | 7/1996 |
| JP | H11-340025 | A | 12/1999 |
| JP | 2000-182873 | A | 6/2000 |
| JP | 2005-210010 | A | 8/2005 |
| JP | 2005-243806 | A | 9/2005 |
| JP | 2006-135056 | A | 5/2006 |
| JP | 2006-310716 | A | 11/2006 |
| JP | 2012-089765 | A | 5/2012 |
| JP | 2013-201375 | A | 10/2013 |
| JP | 2015-032625 | A | 2/2015 |
| KR | 2013-0125105 | A | 11/2013 |

* cited by examiner

METHOD FOR MANUFACTURING COIL COMPONENT HAVING RESIN WALLS

CROSS-REFERENCE TO RELATED APPLICATIONS

This application is a division of U.S. patent application Ser. No. 16/555,169, filed Aug. 29, 2019, which is a continuation of U.S. patent application Ser. No. 14/951,004, filed Nov. 24, 2014, now U.S. Pat. No. 10,468,184, which is based upon and claims the benefit of priority from Japanese Patent Applications No. 2014-241869, 2014-241875, 2014-241876, filed on Nov. 28, 2014, the entire contents of which are incorporated herein by reference.

TECHNICAL FIELD

The present invention relates to a coil component and a method for manufacturing the same.

BACKGROUND

Coil components such as surface mount-type planar coil elements are conventionally used in various electrical products such as household devices and industrial devices. In particular, small portable devices have come to be required to obtain two or more voltages from a single power source to drive individual devices due to enhanced functions. Therefore, surface mount-type planar coil elements are used also as power sources to satisfy such a requirement.

Such coil components are disclosed in, for example, following Japanese Unexamined Patent Publication No. 2006-310716, Japanese Unexamined Patent Publication No. 2012-089765, and Japanese Unexamined Patent Publication No. 2013-201375. The coil components disclosed in these documents each include a substrate, planar spiral air core coils provided on front and back surfaces of the substrate, and a through-hole conductor provided so as to pass through the substrate at magnetic cores of the air core coils to connect the air core coils to each other.

SUMMARY

The above-described air core coil is formed by growing a conductive material, such as Cu, by plating on a seed pattern provided on the substrate, but the space between adjacent turns of a winding part of the coil becomes narrow due to the plating growth in the planar direction of the substrate. When the space between adjacent turns of the winding part of the coil is narrow, there is a fear that the insulation of the coil is reduced. For this reason, there is demand for a technique to more reliably insulate the coil.

A coil component according to one aspect of the present invention comprises: a substrate; a coil provided by plating growth on a main surface of the substrate; a resin body that is provided before the coil is grown by plating on the main surface of the substrate and that has two or more resin walls between which a winding part of the coil extends; and a coating resin that comprises a magnetic powder-containing resin and integrally covers the coil and the resin body provided on the main surface of the substrate.

A method for manufacturing the coil component according to one aspect of the present invention comprises the steps of: preparing a substrate having a main surface on which a resin body having two or more resin walls is provided; growing a coil by plating on the main surface of the substrate so that a winding part of the coil extends between the resin walls; and integrally covering the coil and the resin body provided on the main surface of the substrate with a coating resin comprising a magnetic powder-containing resin.

In the coil component and the method for manufacturing the same, the winding part of the coil is grown by plating so as to extend between the resin walls of the resin body provided before the coil is grown by plating. The resin wall is interposed between adjacent turns of the winding part of the coil during the plating growth, and therefore contact between adjacent turns of the winding part of the coil does not occur. This makes it possible to more reliably insulate the coil.

The above-described air core coil is formed by growing a conductive material, such as Cu, by plating on a seed pattern provided on the substrate. However, after the plating growth, the coil is covered with an insulating resin, and the insulating resin is cured. Therefore, the coil covered with the insulating resin is tightly bonded with the insulating resin. When the ambient temperature changes (e.g., when the ambient temperature becomes high), stress is generated which results from the difference in coefficient of thermal expansion between the coil and the insulating resin. Therefore, when the insulating resin and the coil are tightly bonded together, relaxation of the stress is difficult so that distortion by stress may occur.

A coil component according to one aspect of the present invention comprises: a substrate; a coil provided by plating growth on a main surface of the substrate; a resin body that is provided on the main surface of the substrate and has two or more resin walls between which a winding part of the coil is interposed in a non-bonding state; and a coating resin that comprises a magnetic powder-containing resin and integrally covers the coil and the resin body provided on the main surface of the substrate.

A method for manufacturing the coil component according to one aspect of the present invention comprises the steps of: preparing a substrate having a main surface on which a resin body having two or more resin walls is provided; growing a coil by plating on the main surface of the substrate so that a winding part of the coil is interposed between the resin walls in a non-bonding state; and integrally covering the coil and the resin body provided on the main surface of the substrate with a coating resin comprising a magnetic powder-containing resin.

In the coil component and the method for manufacturing the same, the winding part of the coil is interposed between the resin walls in a non-bonding state, and therefore the winding part of the coil and the resin walls can be displaced with respect to each other. Therefore, even when stress resulting from the difference in coefficient of thermal expansion between the winding part of the coil and the resin walls is generated due to a change in ambient temperature, the stress is relaxed by relative displacement between the winding part of the coil and the resin walls.

The above-described air core coil is formed by growing a conductive material, such as Cu, by plating on a seed pattern provided on the substrate. However, after the plating growth, the entire periphery of the coil is integrally covered with an insulating resin, and the insulating resin is cured. The insulating resin has a size and shape corresponding to the size and shape of the coil previously formed on the substrate. Therefore, for example, when the coil is not properly formed, there is a fear that the insulating resin cannot have the same size and shape as designed.

A coil component according to one aspect of the present invention comprises: a substrate; a coil provided by plating growth on a main surface of the substrate; a resin body that is provided on the main surface of the substrate and has two or more resin walls between which a winding part of the coil is interposed; and a coating resin that comprises a magnetic powder-containing resin and integrally covers the coil and the resin body provided on the main surface of the substrate, wherein the resin walls have a height equal to or larger than that of the winding part of the coil, and the resin walls do not extend to a region above the winding part of the coil.

A method for manufacturing the coil component according to one aspect of the present invention comprises the steps of: preparing a substrate having a main surface on which a resin body having two or more resin walls is provided; growing a coil by plating on the main surface of the substrate so that a winding part of the coil is interposed between the resin walls; and integrally covering the coil and the resin body provided on the main surface of the substrate with a coating resin comprising a magnetic powder-containing resin, wherein the resin walls have a height equal to or larger than that of the winding part of the coil, and the resin walls do not extend to a region above the winding part of the coil.

In the coil component and the method for manufacturing the same, the winding part of the coil is grown by plating so as to be interposed between the resin walls of the resin body. That is, the resin wall is already interposed between adjacent turns of the winding part of the coil before the coil is covered with the coating resin. Therefore, it is not necessary to separately fill the space between adjacent turns of the winding part of the coil with resin. Further, the resin walls stabilize the dimensional accuracy of resin between adjacent turns of the winding part of the coil.

The resin walls of the resin body may have a height larger than that of the winding part of the coil. In this case, the winding part can have the same thickness as designed throughout its height. Further, it is possible to significantly avoid a situation in which adjacent turns of the winding part come into contact with each other above the resin wall.

The resin walls of the resin body may have a rectangular cross-section. In this case, the resin walls of the resin body may have an aspect ratio larger than 1 to extend in a direction of a normal to the main surface of the substrate.

The winding part of the coil may have a rectangular cross-section. In this case, the cross-section of the winding part of the coil may have an aspect ratio larger than 1 to extend in a direction of a normal to the main surface of the substrate.

The coil component may further comprise an insulator provided so as to be in contact with an upper surface of the winding part of the coil.

The outermost one of the resin walls arranged on the main surface of the substrate may have a thickness larger than that of the resin wall(s) located inside thereof.

The resin walls of the resin body may have a width in a range of 5 to 30 μm and a height in a range of 50 to 300 μm.

DETAILED DESCRIPTION

Figure 1:
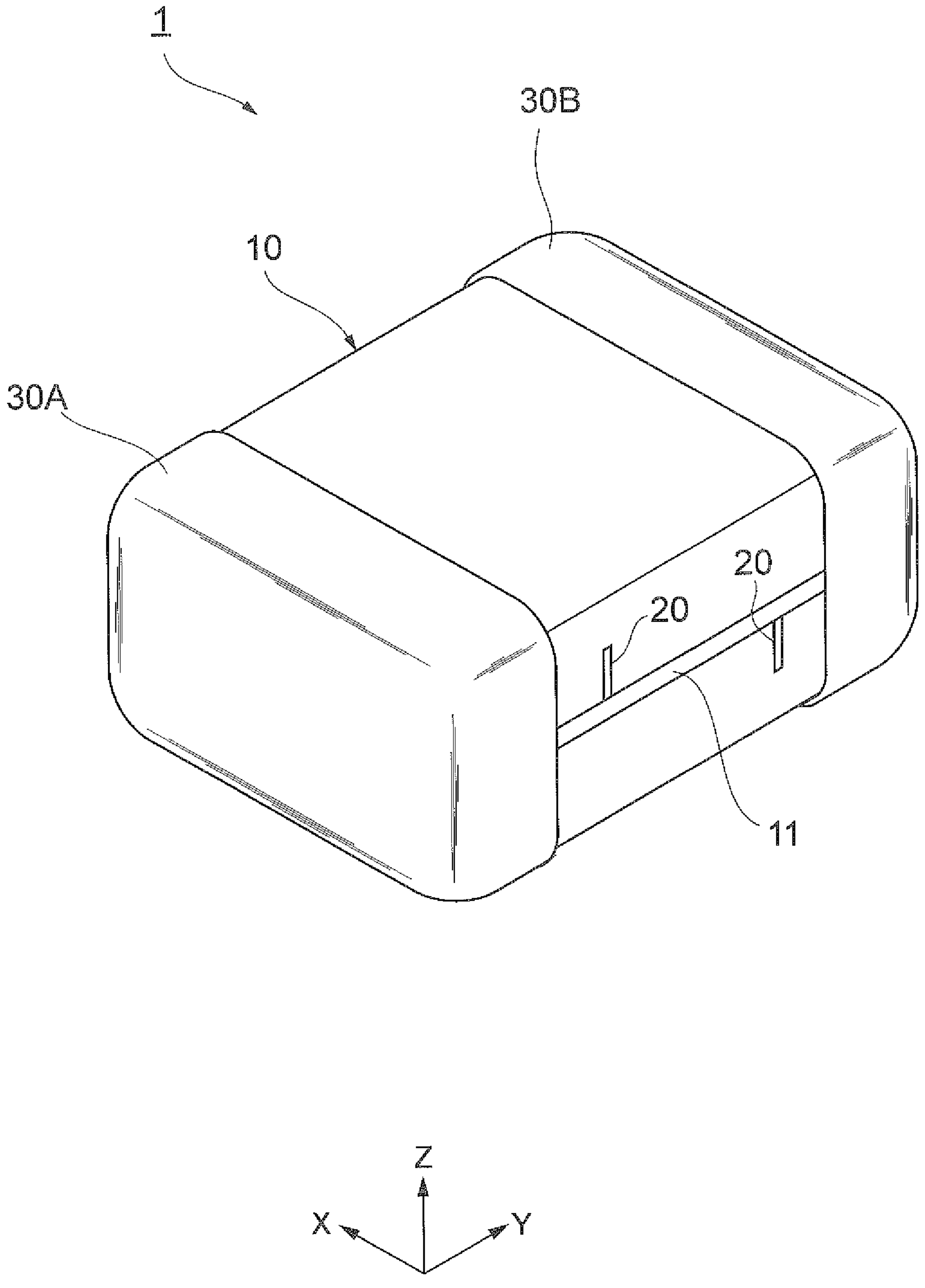
FIG. 1 is a schematic perspective view of a coil component according to an embodiment of the present invention.

Hereinbelow, an embodiment of the present invention will be described in detail with reference to the accompanying drawings. It is to be noted that in the following description, the same elements or elements having the same function are represented by the same reference numerals, and description thereof will not be repeated.

First, the structure of a coil component according to an embodiment of the present invention will be described with reference to FIGS. 1 to 4. For convenience of description, as shown in the drawings, X-, Y-, and Z-coordinates are set. More specifically, the thickness direction of the coil component is defined as a Z direction, a direction in which external terminal electrodes are opposed to each other is defined as a Y direction, and a direction orthogonal to the Z direction and the Y direction is defined as an X direction.

A coil component 1 includes a main body 10 having an approximate rectangular parallelepiped shape, and a pair of external terminal electrodes 30A and 30B provided to cover a pair of opposing end faces of the main body 10. The coil component 1 is designed to have, for example, a long side of 2.0 mm, a short side of 1.6 mm, and a height of 0.9 mm.

Hereinbelow, the production procedure of the main body 10 will be described while the structure of the coil component 1 will also be described.

Figure 2:
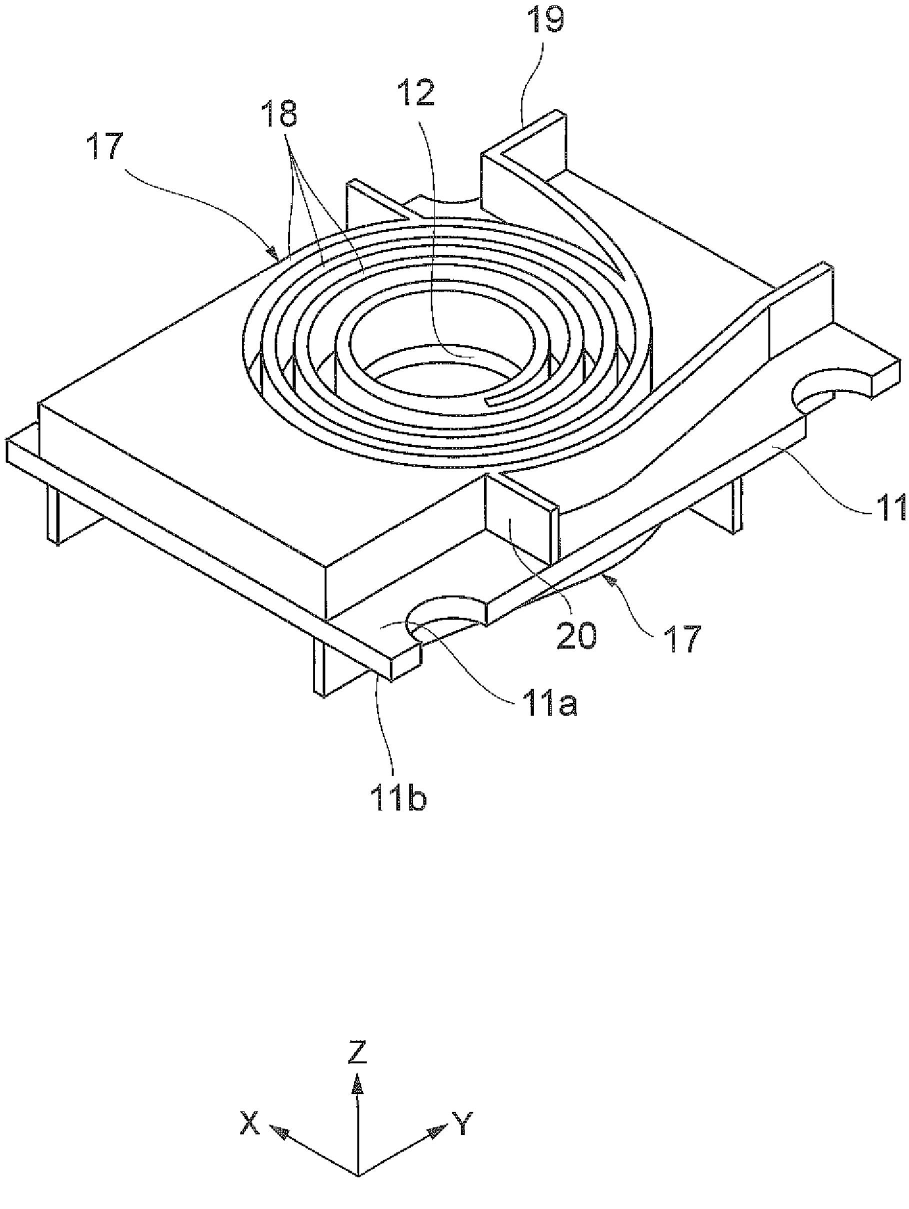
FIG. 2 is a perspective view of a substrate for use in manufacturing the coil component shown in FIG. 1.

The main body 10 includes a substrate 11 shown in FIG. 2. The substrate 11 is a plate-like rectangular member made of a non-magnetic insulating material. In the central part of the substrate 11, an approximately-circular opening 12 is provided to pass through the substrate 11 so that main surfaces 11*a* and 11*b* are connected to each other through the opening 12. As the substrate 11, a substrate can be used which is obtained by impregnating a glass cloth with a cyanate resin (BT (bismaleimide triazine) resin: trademark) and has a thickness of 60 μm. It is to be noted that polyimide, aramid, or the like may be used instead of BT resin. As a material of the substrate 11, ceramics or glass may also be used. Preferred examples of the material of the substrate 11 include mass-produced printed circuit board materials. Particularly, resin materials used for BT printed circuit boards, FR4 printed circuit boards, or FR5 printed circuit boards are most preferred.

Figure 3:
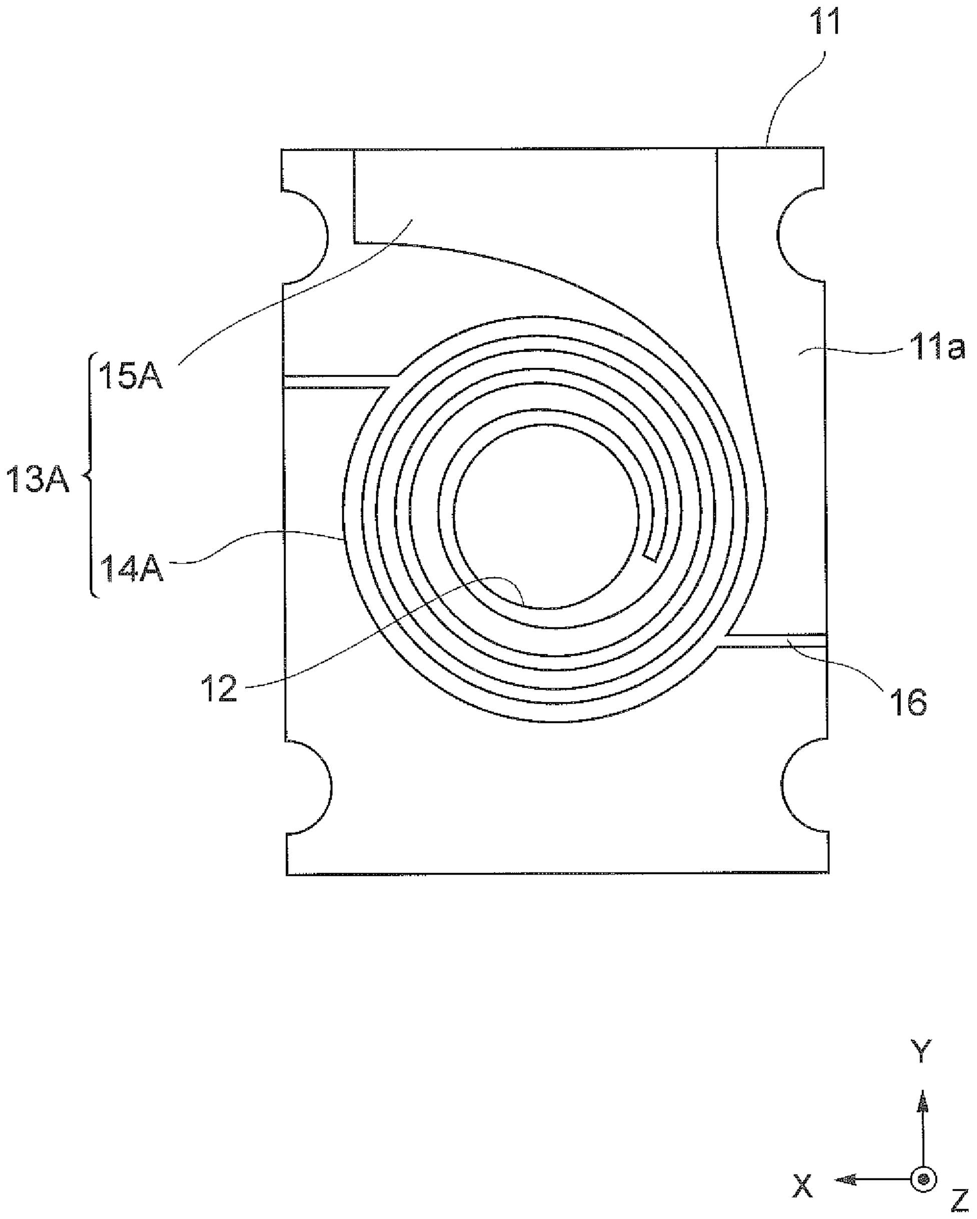
FIG. 3 is a plan view of a seed pattern on the substrate shown in FIG. 2.

On each of the main surfaces 11*a* and 11*b* of the substrate 11, as shown in FIG. 3, a seed pattern 13A is formed which allows a coil 13 that will be described later to be grown by plating. The seed pattern 13A has a spiral pattern 14A winding around the opening 12 of the substrate 11 and an end pattern 15A formed at the end thereof in the Y direction of the substrate 11. These patterns 14A and 15A are continuously and integrally formed. It is to be noted that the coil 13 provided on the one main surface 11*a* and the coil 13 provided on the other main surface 11*b* are opposite in electrode extraction direction, and therefore the end pattern 15A on the one main surface 11*a* and the end pattern on the other main surface 11*b* are formed at different ends in the Y direction of the substrate 11.

On each of the main surfaces 11*a* and 11*b*, a conductive pattern 16 is provided in addition to the seed pattern 13A. During the plating growth of the coil 13 that will be described later, the substrate 11 having the seed pattern 13A formed thereon is in a wafer state. That is, the seed patterns 13A are regularly arranged on the surface of a substrate wafer. In order to apply a voltage to the individual seed patterns 13A in such a state, the adjacent seed patterns 13A need to be previously electrically connected to each other. The conductive pattern 16 is provided to establish such an electrical connection. Therefore, the conductive pattern 16 is used during plating growth but becomes unnecessary after plating growth.

Again referring to FIG. 2, a resin body 17 is provided on each of the main surfaces 11*a* and 11*b* of the substrate 11. The resin body 17 is a patterned thick resist provided by known photolithography. The resin body 17 has resin walls 18 that define the growth region of a winding part 14 of the coil 13 and a resin wall 19 that defines the growth region of an extraction electrode part 15 of the coil 13. Further, the resin body 17 has also a resin wall 20 that is provided on the conductive pattern 16 to prevent plating growth on the conductive pattern 16.

Figure 4:
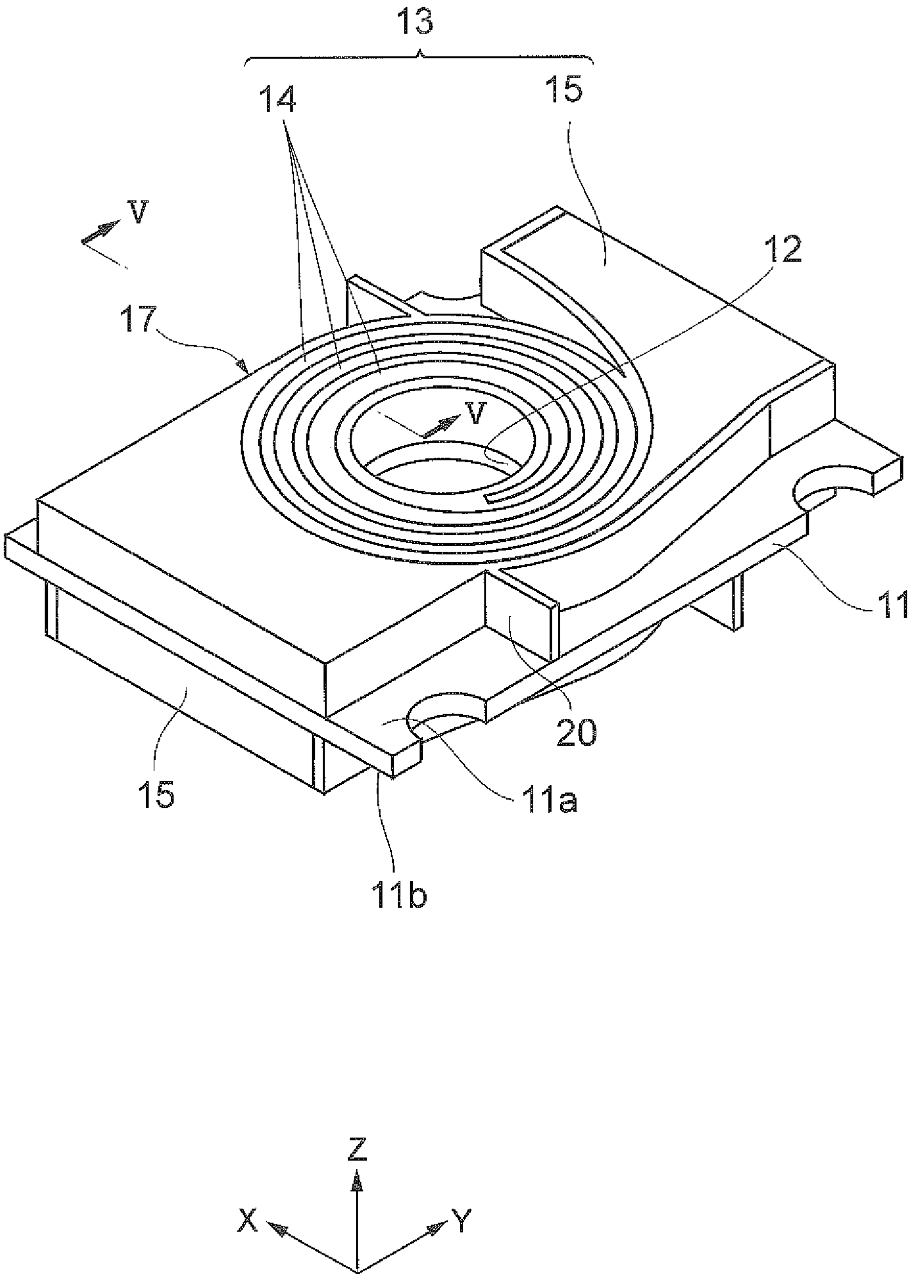
FIG. 4 is a perspective view illustrating one step of a method for manufacturing the coil component shown in FIG. 1.

FIG. 4 illustrates the state of the substrate 11 after the coil 13 is grown by plating using the seed pattern 13A. The plating growth of the coil 13 can be performed by a known plating growth method.

The coil 13 is made of copper, and has the winding part 14 formed on the spiral pattern 14A of the seed pattern 13A and the extraction electrode part 15 formed on the end pattern 15A of the seed pattern 13A. When viewed from above, the coil 13 has almost the same shape as the seed pattern 13A. That is, the coil 13 and the seed pattern 13A have the shape of a planar spiral air core coil that extends in parallel with the main surfaces 11*a* and 11*b* of the substrate 11. More specifically, the winding part 14 provided on the upper surface 11*a* of the substrate spirals outwardly in a counterclockwise direction when viewed from the upper surface side, and the winding part 14 provided on the lower surface 11*b* of the substrate spirals outwardly in a counterclockwise direction when viewed from the lower surface side. When an electrical current is passed in a single direction through the coils 13 provided on the both surfaces so as to be connected to each other at their ends in the opening 12, a direction in which the electrical current passing through one of the coils 13 rotates and a direction in which the electrical current passing through the other coil 13 rotates are the same, and therefore magnetic fluxes generated by the coils 13 are superimposed and enhance each other.

Figure 5:
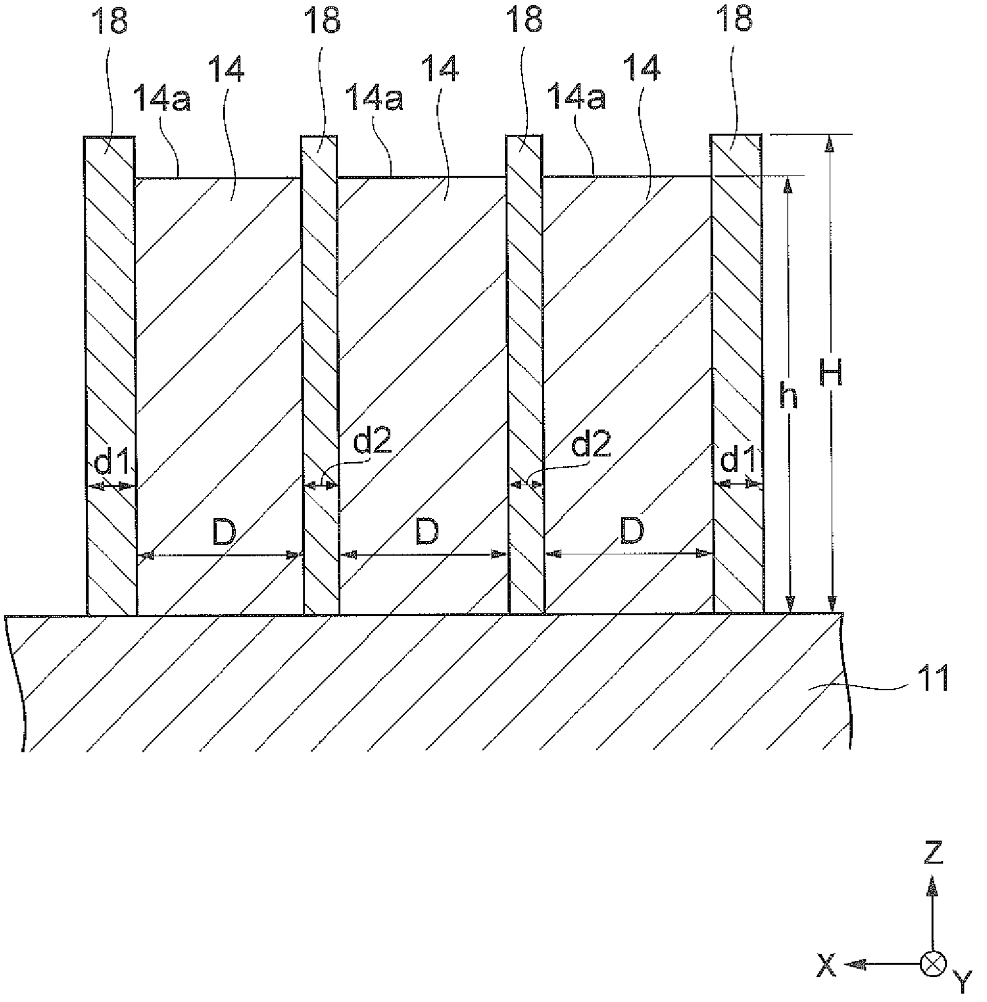
FIG. 5 is a sectional view taken along a line V-V in FIG. 4.

FIG. 5 is a sectional view taken along a line V-V in FIG. 4 illustrating the state of the substrate 11 after plating growth. It is to be noted that the seed pattern 13A is not shown in FIG. 5.

As shown in FIG. 5, the resin walls 18 having a rectangular cross-section are formed on the substrate 11 so as to extend in the direction of a normal to the substrate 11 (Z direction), and the winding part 14 of the coil 13 grows in the Z direction between the resin walls 18. The growth region of the winding part 14 of the coil 13 is previously defined by the resin walls 18 formed on the substrate 11 before plating growth. Therefore, the winding part 14 of the coil 13 grows so as to fill a space defined between the adjacent two resin walls 18, and therefore has the same shape as the space defined between the resin walls 18 and extends in the direction of a normal to the substrate 11 (Z direction). That is, the shape of the winding part 14 of the coil 13 is adjusted by adjusting the shape of the space defined between the resin walls 18, and therefore the winding part 14 of the coil 13 can be formed to have the same shape as designed. The cross-section of the winding part 14 of the coil 13 has a height of, for example, 80 to 260 μm, a width (thickness) of, for example, 40 to 260 μm, and an aspect ratio of, for example, 1 to 5. The aspect ratio of the winding part 14 of the coil 13 may be 2 to 5. The cross-section of the resin walls 18 has a height of, for example, 50 to 300 μm, a width (thickness) of, for example, 5 to 30 μm, and an aspect ratio of, for example, 5 to 30. The cross-section of the resin walls 18 may have a height of 180 to 300 μm, a width (thickness) of 5 to 12 μm, and an aspect ratio of 15 to 30.

The winding part 14 of the coil 13 grows between the adjacent two resin walls 18 while coming into contact with the inner side surfaces of the resin walls 18 defining the growth region. At this time, neither mechanical bonding nor chemical bonding occurs between the winding part 14 of the coil 13 and the resin walls 18. That is, the winding part 14 of the coil 13 is grown by plating without bonding to the resin walls 18, and is therefore interposed between the resin walls 18 in a non-bonding state. In this specification, the term "non-bonding state" refers to a state in which neither mechanical bonding such as anchor effect nor chemical bonding such as covalent bonding has occurred.

As shown in FIG. 5, the height h of the winding part 14 of the coil 13 is preferably lower than the height H of the resin walls 18 ($h<H$). That is, the plating growth of the winding part 14 of the coil 13 is preferably adjusted so as to stop at a position lower than the height H of the resin walls 18. When the height h of the winding part 14 of the coil 13 is lower than the height H of the resin walls 18, the winding part 14 has the same thickness as designed throughout its height. If the height h of the winding part 14 of the coil 13 is higher than the height H of the resin walls 18, the voltage resistance of the coil 13 is reduced due to, for example, contact between adjacent turns of the winding part 14.

The winding part 14 of the coil 13 has a uniform thickness D throughout its height. This is because the space between the adjacent resin walls 18 is uniform throughout its height.

Further, a top surface 14*a* of the winding part 14 of the coil 13 is almost parallel to the main surface 11*a* of the substrate 11. This is because when the winding part 14 of the coil 13 is grown by plating, the top surface of the winding part 14 is kept parallel to the main surface 11*a* of the substrate 11.

It is to be noted that similarly to the winding part 14 of the coil 13, each of the resin walls 18 also has a uniform thickness d1 or d2 throughout its height. As a result, the space between adjacent turns of the winding part 14 of the coil 13 becomes uniform throughout its height. That is, the winding part 14 of the coil 13 has a structure in which a thin portion (i.e., a portion having a low voltage resistance) is not localized or is less likely to be localized in its height direction.

Further, the upper end of the space defined by the resin walls 18 is open, and the upper ends of the resin walls 18 do not extend to and cover a region above the winding part 14, which expands the flexibility of design of the region above the winding part 14. That is, a selection may be made between an embodiment in which any layer is formed on the winding part 14 and an embodiment in which no layer is formed on the winding part 14.

Figure 6:
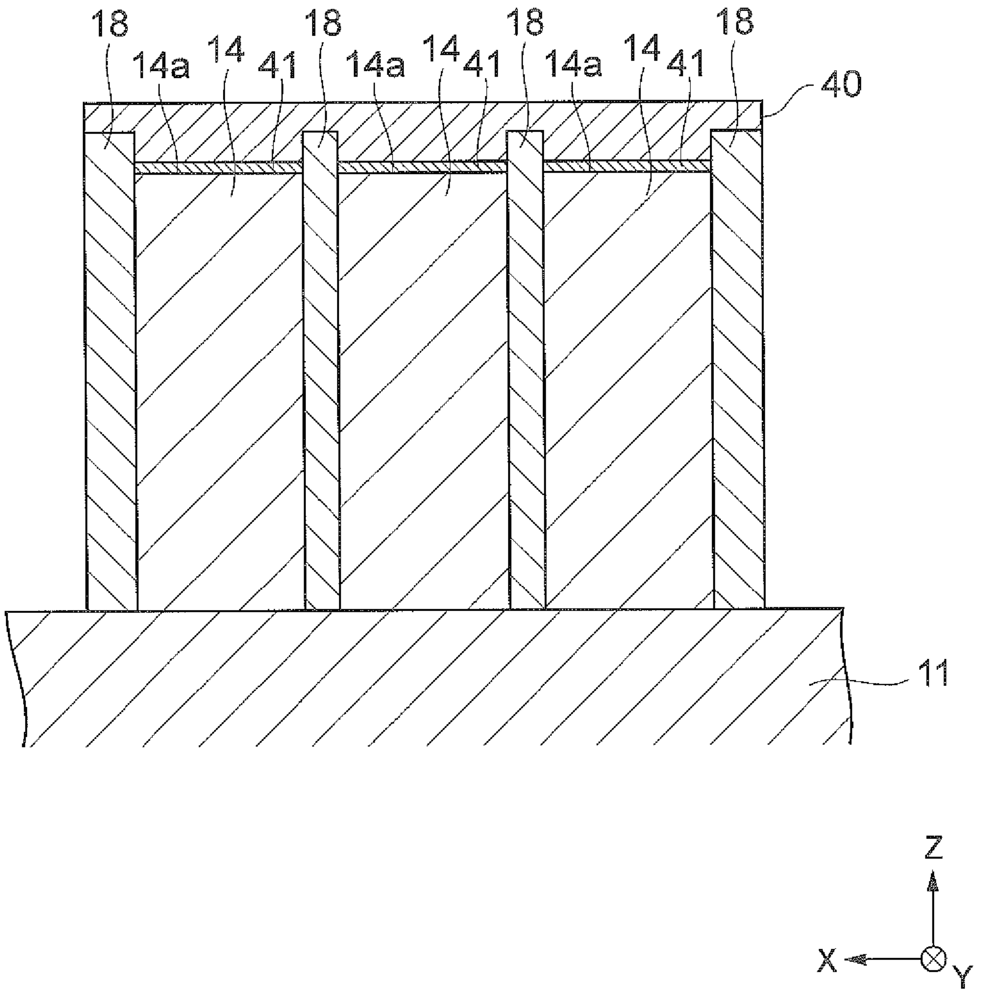
FIG. 6 is a sectional view of an insulator provided on a winding part of a coil.

When a layer is formed on the winding part 14, the type or material of the layer may be arbitrarily selected. For example, as shown in FIG. 6, an insulator 40 may be provided on the winding part 14 to enhance insulation between a metal magnetic powder contained in a coating resin 21 that will be described later and the winding part 14. The insulator 40 may be made of an insulating resin or an insulating magnetic material. Further, the insulator 40 is in direct or indirect contact with the upper surface 14*a* of the winding part 14, and integrally covers the winding part 14 and the resin walls 18. It is to be noted that the insulator 40 may also be configured to selectively cover only the winding part 14. Further, a predetermined joint layer (e.g., a blackened copper plating layer) 41 may be provided to enhance joinability between the winding part 14 and the insulator 40.

Further, as shown in FIG. 5, the thickness d1 of the outermost one of the resin walls 18 is preferably lager than the thickness d2 of the resin walls 18 located inside the outermost resin wall 18 (d1>d2). In this case, stiffness against pressure applied in the Z direction when the coil component 1 is produced or used is imparted. The thick resin wall 18 arranged outermost mainly receives the pressure. From the viewpoint of stiffness, both the outermost and innermost resin walls 18 are preferably thicker than the resin walls 18 located inside thereof.

It is to be noted that plating growth of the coil 13 is performed on both the main surfaces 11*a* and 11*b* of the substrate 11. The coils 13 on both the main surfaces 11*a* and 11*b* are electrically connected to each other at their ends in the opening of the substrate 11.

Figure 7:
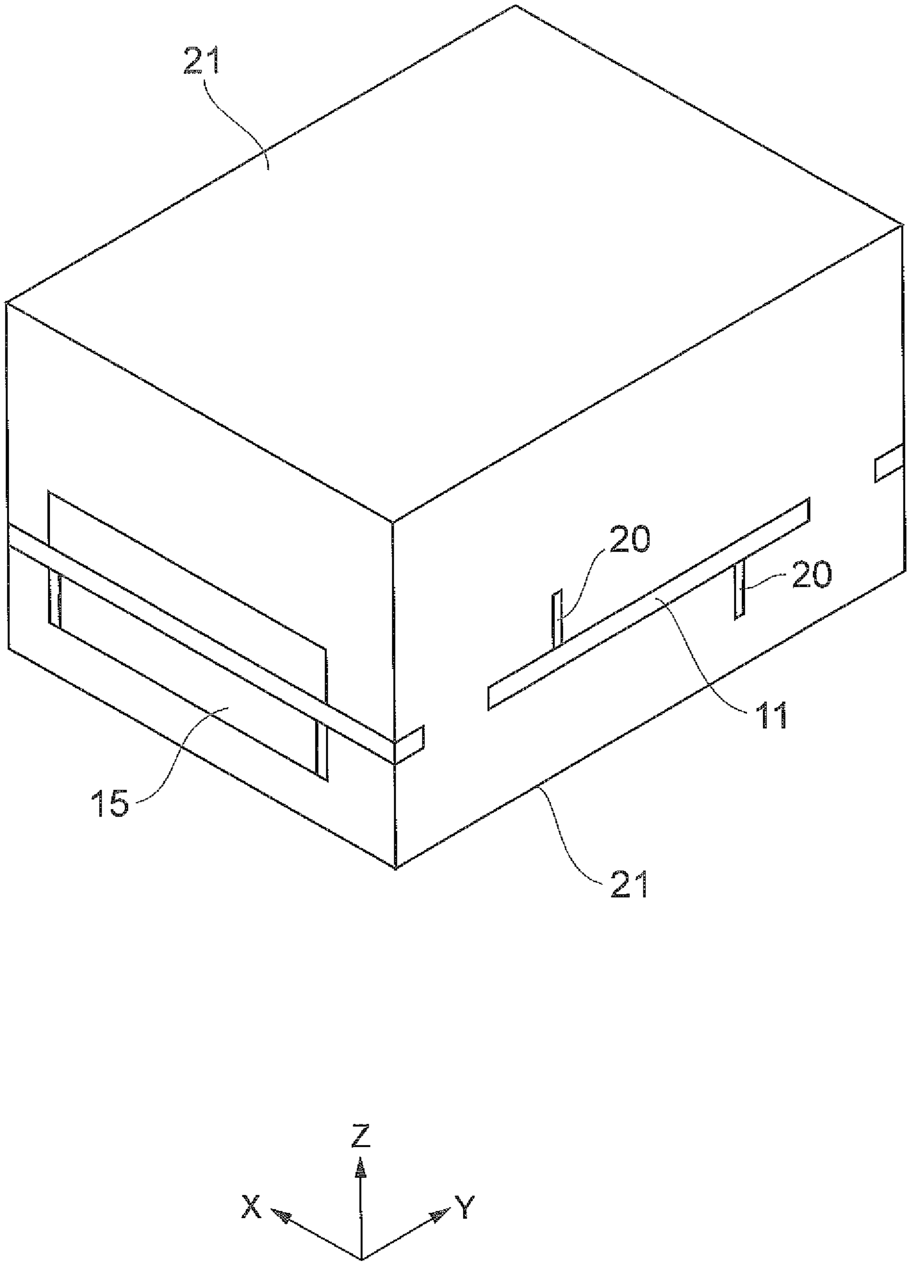
FIG. 7 is a perspective view illustrating one step of the method for manufacturing the coil component shown in FIG. 1.

After the coils 13 are grown by plating on the substrate 11, as shown in FIG. 7, the substrate 11 is entirely covered with the coating resin 21. That is, the coating resin 21 integrally covers the coils 13 on the main surfaces 11*a* and 11*b* of the substrate 11 and the resin body 17. The resin body 17 remains inside the coating resin 21 to serve as a constituent part of the coil component 1. The coating resin 21 comprises a metal magnetic powder-containing resin, and is printed on the substrate 11 in a wafer state and then temporarily cured. Then, the coating resin 21 is polished to a predetermined thickness and is then finally cured.

The metal magnetic powder-containing resin constituting the coating resin 21 comprises a resin containing a metal magnetic powder dispersed therein. The metal magnetic powder may be made of, for example, an iron-nickel alloy (permalloy), carbonyl iron, an amorphous metal, an amorphous or crystalline FeSiCr-based alloy, or Sendust. The resin used in the metal magnetic powder-containing resin is, for example, a thermosetting epoxy resin. The amount of the metal magnetic powder contained in the metal magnetic powder-containing resin is, for example, 90 to 99 wt %.

Figure 8:
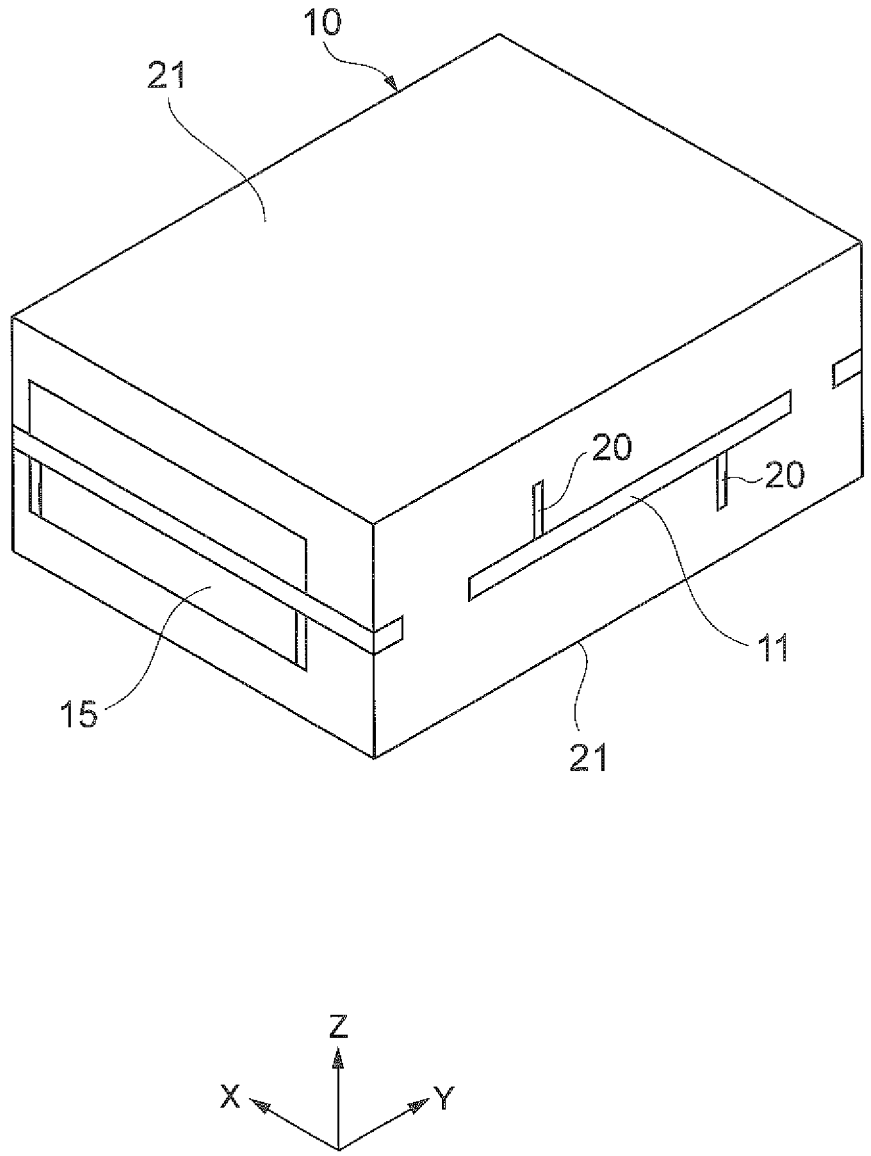
FIG. 8 is a perspective view illustrating one step of the method for manufacturing the coil component shown in FIG. 1.

Further, the substrate 11 in a wafer state is thinned to a predetermined thickness by, for example, polishing and then diced into chips. In this way, the main body 10 shown in FIG. 8 is obtained. After the substrate 11 is diced into chips, the edges of the chips may be beveled by, for example, barrel polishing, if necessary.

Finally, external terminal electrodes 30A and 30B are provided at end faces of the main body 10 (end faces opposed to each other in the Y direction), at which the end patterns 15A are exposed, so as to be electrically connected to the end patterns 15A. In this way, the coil component 1 is completed. The external terminal electrodes 30A and 30B are provided to connect the coil component to the circuit of a substrate on which the coil component is to be mounted, and may have a multi-layer structure. For example, the external terminal electrodes 30A and 30B may be formed by applying a resin electrode material onto the end faces and then coating the resin electrode material with metal plating. The metal plating used to form the external terminal electrodes 30A and 30B may be made of, for example, Cr, Cu, Ni, Sn, Au, or solder.

Figure 9:
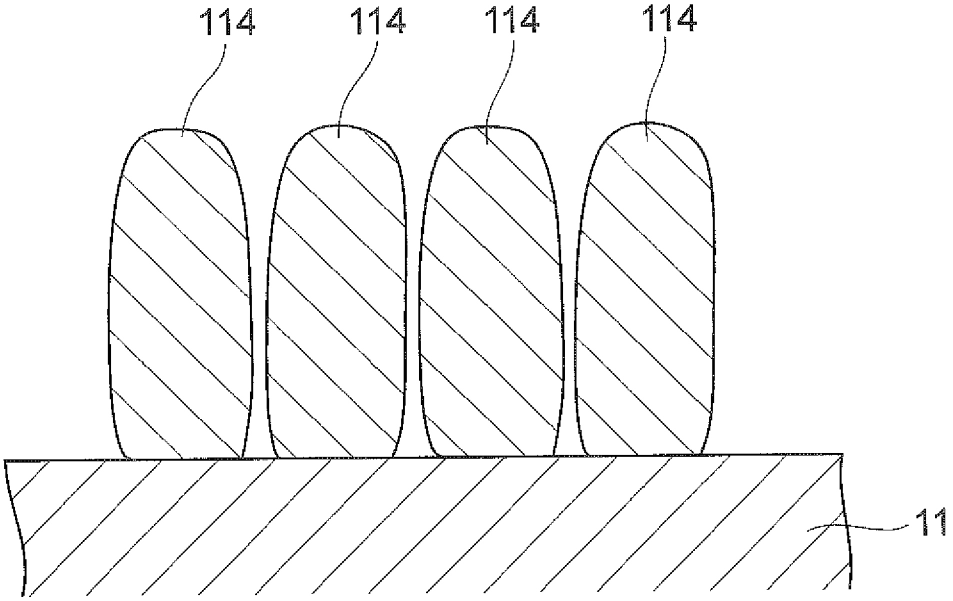
FIG. 9 is a sectional view illustrating the state of a coil grown by plating according to a conventional technique.

In the coil component 1 and the method for manufacturing the same, as shown in FIG. 5, the winding part 14 of the coil 13 is grown by plating so as to extend between the resin walls 18 of the resin body 17 provided before the coil 13 is grown by plating. The resin wall 18 is interposed between adjacent turns of the winding part 14 of the coil 13 during the plating growth, and therefore contact between adjacent turns of the winding part 14 of the coil 13 is avoided so that the coil 13 is more reliably insulated. On the other hand, when a winding part 114 is grown on the substrate 11 in the absence of the resin walls 18, as shown in FIG. 9, the winding part 114 cannot have a fixed shape. That is, nothing is provided to define the plating growth region of the winding part 114, and therefore the winding part 114 is less likely to have the same shape as designed. In this case, the winding part 114 grows not only in its height direction (vertical growth) but also in the planar direction of the substrate 11 (horizontal growth). The horizontal growth results in, for example, contact between adjacent turns of the winding part 114 so that the voltage resistance of the coil is reduced. Particularly, when the winding part 114 is grown to a great height, the thickness of the winding part 114 increases due to the horizontal growth, and therefore a reduction in voltage resistance is more remarkable.

Further, the horizontal growth results in a narrow space between adjacent turns of the winding part 114. Therefore, it is difficult to fill the space between adjacent turns of the winding part 114 with a resin for ensuring the insulation of the winding part 114. Even if the space between adjacent turns of the winding part 114 can be filled with a resin, air bubbles are likely to be generated in the resin during filling, and therefore there is a fear that necessary and sufficient voltage resistance cannot be obtained.

Further, the space between adjacent turns of the winding part 114 varies in width in its height direction, and therefore voltage resistance is reduced in a portion where the space is relatively narrow.

In the coil component 1 and the method for manufacturing the same, the winding part 14 of the coil 13 is interposed between the resin walls 18 in a non-bonding state, and therefore the winding part 14 of the coil 13 and the resin walls 18 can be displaced with respect to each other. Therefore, even when generated due to a change in ambient temperature such as an increase in the temperature of an environment in which the coil component 1 is used, stress resulting from the difference in the coefficient of thermal expansion between the winding part 14 of the coil 13 and the resin walls 18 is relaxed by relative displacement between the winding part 14 of the coil 13 and the resin walls 18.

In the coil component 1 and the method for manufacturing the same, the winding part 14 of the coil 13 is grown by plating so as to be interposed between the resin walls 18 of the resin body 17. That is, the resin wall 18 is already interposed between adjacent turns of the winding part 14 of the coil 13 before the coil 13 is covered with the coating resin 21. Therefore, it is not necessary to separately fill the space between adjacent turns of the winding part 14 of the coil 13 with resin. Further, the resin walls 18 stabilize the dimensional accuracy of resin between adjacent turns of the winding part 14 of the coil 13.

What is claimed is:

1. A method for manufacturing a coil component, comprising the steps of:

preparing a substrate having a main surface on which a resin body having a plurality of resin walls is provided;

forming a seed pattern on the main surface of the substrate, the seed pattern not being intentionally formed on the resin walls;

growing a coil on the main surface of the substrate so that a winding part of the coil extends between the resin walls, the winding part being grown according to the seed pattern; and integrally covering the coil and the resin body, together with the resin walls, provided on the main surface of the substrate with a coating resin comprising a magnetic powder-containing resin, wherein the plurality of resin walls include a resin wall located outermost, a resin wall adjacent to the resin wall located outermost, a resin wall located innermost and a resin wall adjacent to the resin wall located innermost and the resin wall located innermost is thicker than the resin wall adjacent to the resin wall located innermost, the substrate and resin walls are separate, and the material of the substrate and the material of the resin walls are different, and the resin walls are not removed after the coil component is manufactured.

2. The method for manufacturing a coil component according to claim 1, wherein the main surface of the substrate is a first main surface, the resin body is a first resin body, the plurality of resin walls is a first plurality of resin walls, the coil is a first coil, the winding part is a first winding part, the substrate has a second main surface opposite to the first main surface, and the step of preparing a substrate further comprises forming a second resin body on the second main surface, the second resin body having a second plurality of resin walls, wherein the step of growing a coil further comprises growing a second coil on the second main surface of the substrate, so that the second coil is connected to the first coil and a second winding part of the second coil is interposed between resin walls of the second plurality of resin walls.

3. The method for manufacturing a coil component according to claim 1, wherein the coating resin further covers and is in direct contact with an area of the main surface of the substrate external to the coil and the resin body.

4. The method for manufacturing a coil component according to claim 1, wherein the resin walls of the resin body have a rectangular cross-section, the resin walls of the resin body have an aspect ratio larger than 1 and extend in a direction of a normal to the main surface of the substrate.

5. The method for manufacturing a coil component according to claim 1, wherein the winding part of the coil has a rectangular cross-section, the cross-section of the winding part of the coil has an aspect ratio larger than 1 and extends in a direction of a normal to the main surface of the substrate.

6. The method for manufacturing a coil component according to claim 1, wherein the resin wall located outermost is thicker than the resin wall adjacent to the resin wall located outermost.

7. A method for manufacturing a coil component, comprising the steps of:

preparing a substrate having a main surface on which a resin body having a plurality of resin walls is provided;

forming a seed pattern on the main surface of the substrate, the seed pattern not being intentionally formed on the resin walls;

growing a coil on the main surface of the substrate so that a winding part of the coil is interposed between the resin walls in a non-bonding state, the winding part being grown according to the seed pattern; and integrally covering the coil and the resin body, together with the resin walls, provided on the main surface of the substrate with a coating resin comprising a magnetic powder-containing resin, wherein the plurality of resin walls include a resin wall located outermost, a resin wall adjacent to the resin wall located outermost, a resin wall located innermost and a resin wall adjacent to the resin wall located innermost and the resin wall located innermost is thicker than the resin wall adjacent to the resin wall located innermost, the substrate and resin walls are separate, and the material of the substrate and the material of the resin walls are different, and the resin walls are not removed after the coil component is manufactured.

8. The method for manufacturing a coil component according to claim 7, wherein the main surface of the substrate is a first main surface, the resin body is a first resin body, the plurality of resin walls is a first plurality of resin walls, the coil is a first coil, the winding part is a first winding part, the substrate has a second main surface opposite to the first main surface, and the step of preparing a substrate further comprises forming a second resin body on the second main surface, the second resin body having a second plurality of resin walls, wherein the step of growing a coil further comprises growing a second coil on the second main surface of the substrate, so that the second coil is connected to the first coil and a second winding part of the second coil is interposed between resin walls of the second plurality of resin walls.

9. The method for manufacturing a coil component according to claim 7, wherein the coating resin further covers and is in direct contact with an area of the main surface of the substrate external to the coil and the resin body.

10. The method for manufacturing a coil component according to claim 7, wherein the resin walls of the resin body have a rectangular cross-section, the resin walls of the resin body have an aspect ratio larger than 1 and extend in a direction of a normal to the main surface of the substrate.

11. The method for manufacturing a coil component according to claim 7, wherein the winding part of the coil has a rectangular cross-section, the cross-section of the winding part of the coil has an aspect ratio larger than 1 and extends in a direction of a normal to the main surface of the substrate.

12. The method for manufacturing a coil component according to claim 7, wherein the resin wall located outermost is thicker than the resin wall adjacent to the resin wall located outermost.

13. A method for manufacturing a coil component, comprising the steps of:

preparing a substrate having a main surface on which a resin body having a plurality of resin walls is provided;

forming a seed pattern on the main surface of the substrate, the seed pattern not being intentionally formed on the resin walls;

growing a coil on the main surface of the substrate so that a winding part of the coil is interposed between the resin walls, the winding part being grown according to the seed pattern; and integrally covering the coil and the resin body, together with the resin walls, provided on the main surface of the substrate with a coating resin comprising a magnetic powder-containing resin, wherein the resin walls have a height equal to or larger than that of the winding part of the coil, and the resin walls do not extend to a region above the winding part of the coil, the plurality of resin walls include a resin wall located outermost, a resin wall adjacent to the resin wall located outermost, a resin wall located innermost and a resin wall adjacent to the resin wall located innermost and the resin wall located innermost is thicker than the resin wall adjacent to the resin wall located innermost, the substrate and resin walls are separate, and the material of the substrate and the material of the resin walls are different, and the resin walls are not removed after the coil component is manufactured.

14. The method for manufacturing a coil component according to claim 13, wherein the main surface of the substrate is a first main surface, the resin body is a first resin body, the plurality of resin walls is a first plurality of resin walls, the coil is a first coil, the winding part is a first winding part, the substrate has a second main surface opposite to the first main surface, and the step of preparing a substrate further comprises forming a second resin body on the second main surface, the second resin body having a second plurality of resin walls, wherein the step of growing a coil further comprises growing a second coil on the second main surface of the substrate, so that the second coil is connected to the first coil and a second winding part of the second coil is interposed between resin walls of the second plurality of resin walls.

15. The method for manufacturing a coil component according to claim 13, wherein the coating resin further covers and is in direct contact with an area of the main surface of the substrate external to the coil and the resin body.

16. The method for manufacturing a coil component according to claim 13, wherein the resin walls of the resin body have a rectangular cross-section, the resin walls of the resin body have an aspect ratio larger than 1 and extend in a direction of a normal to the main surface of the substrate.

17. The method for manufacturing a coil component according to claim 13, wherein the winding part of the coil has a rectangular cross-section, the cross-section of the winding part of the coil has an aspect ratio larger than 1 and extends in a direction of a normal to the main surface of the substrate.

18. The method for manufacturing a coil component according to claim 13, wherein the resin wall located outermost is thicker than the resin wall adjacent to the resin wall located outermost.

* * * * *